E. T. TURNEY.
PLAYING ATTACHMENT FOR MUSICAL INSTRUMENTS.
APPLICATION FILED AUG. 23, 1906.
1,107,557.
Patented Aug. 18, 1914.
9 SHEETS—SHEET 1.
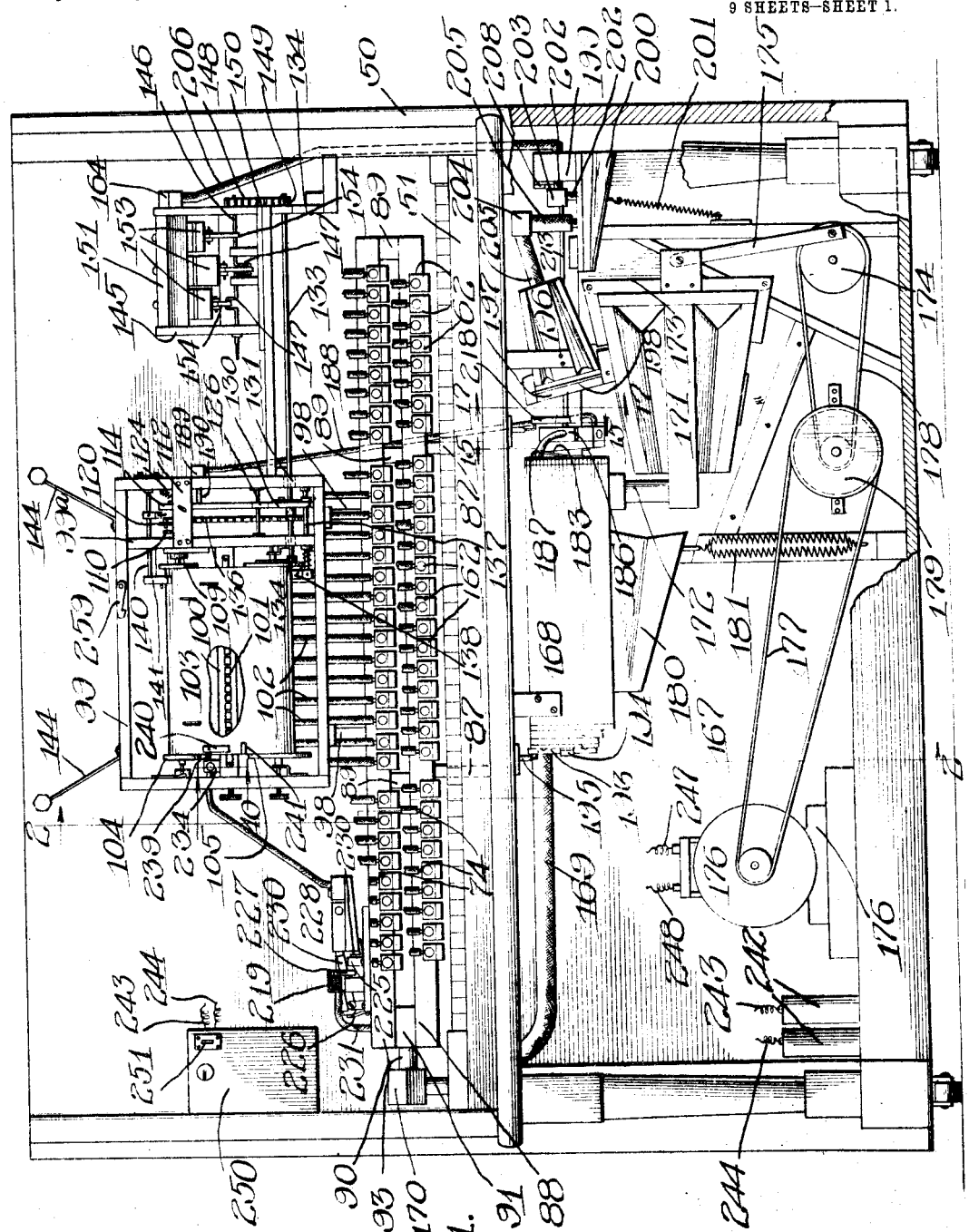
Witnesses:
G. V. Domarus.
G. N. Jochum, Jr.
Inventor:
E. T. Turney
by Brown & Hopkins
Attys E. T. TURNEY.
PLAYING ATTACHMENT FOR MUSICAL INSTRUMENTS.
APPLICATION FILED AUG. 23, 1906.
1,107,557.
Patented Aug. 18, 1914.
9 SHEETS—SHEET 2.
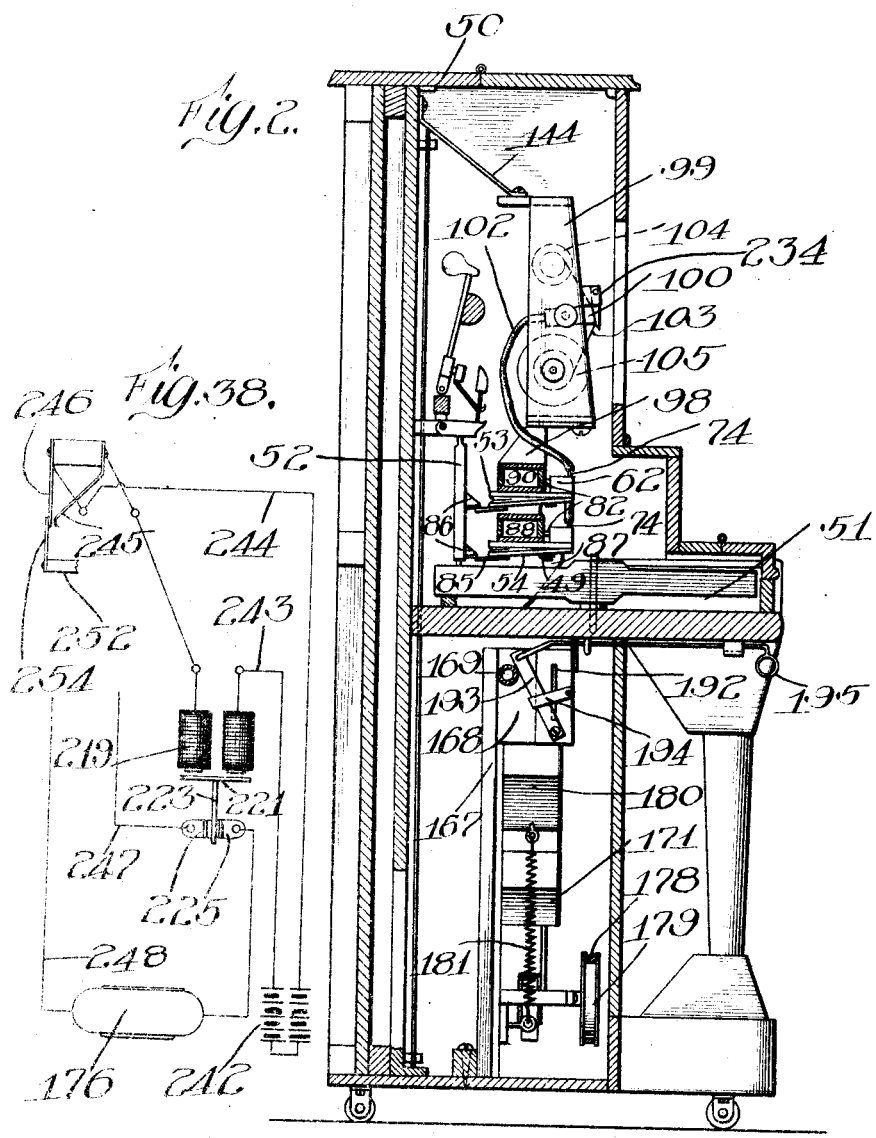
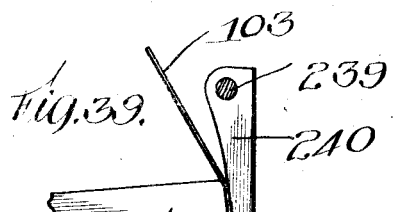

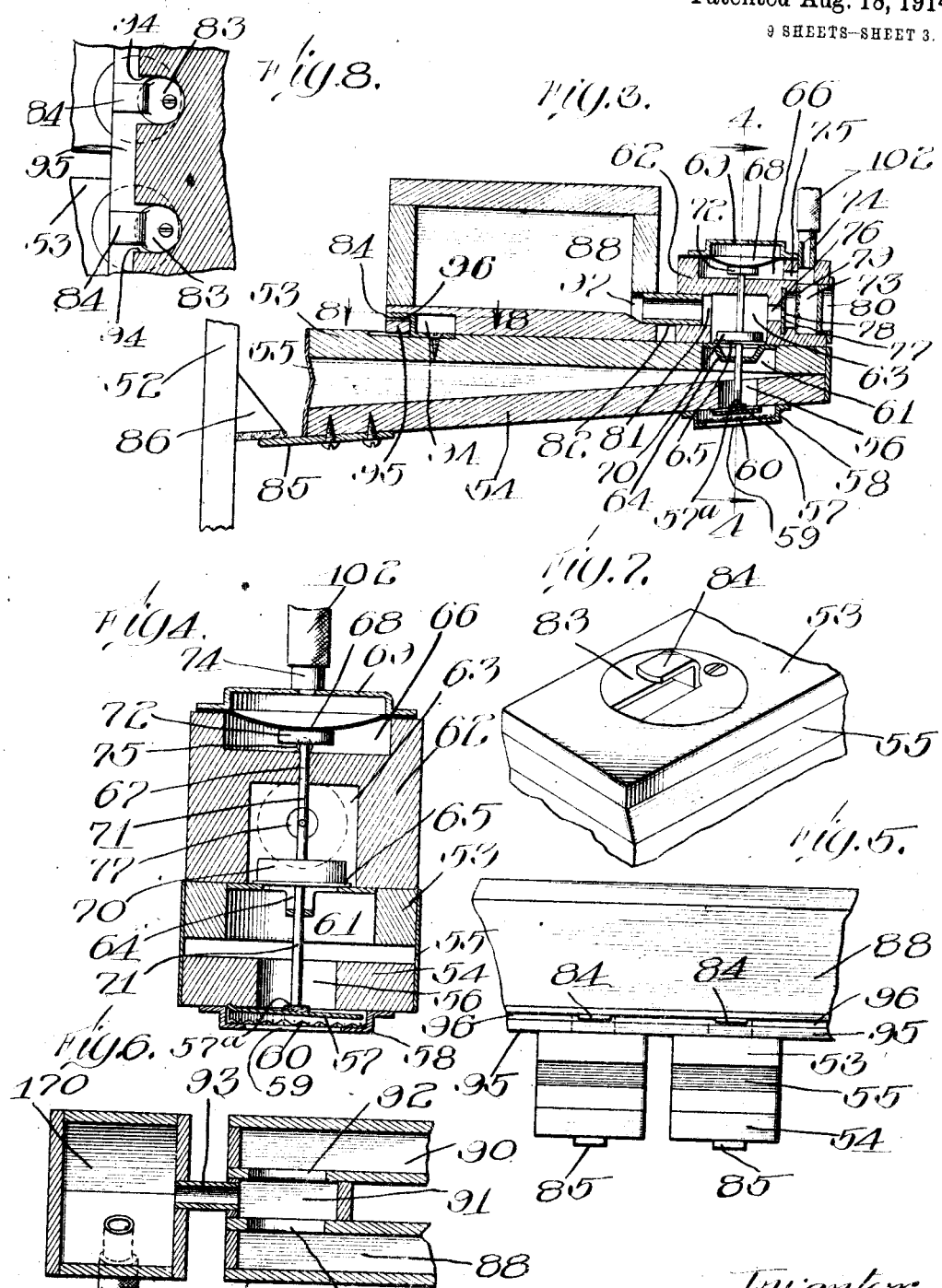

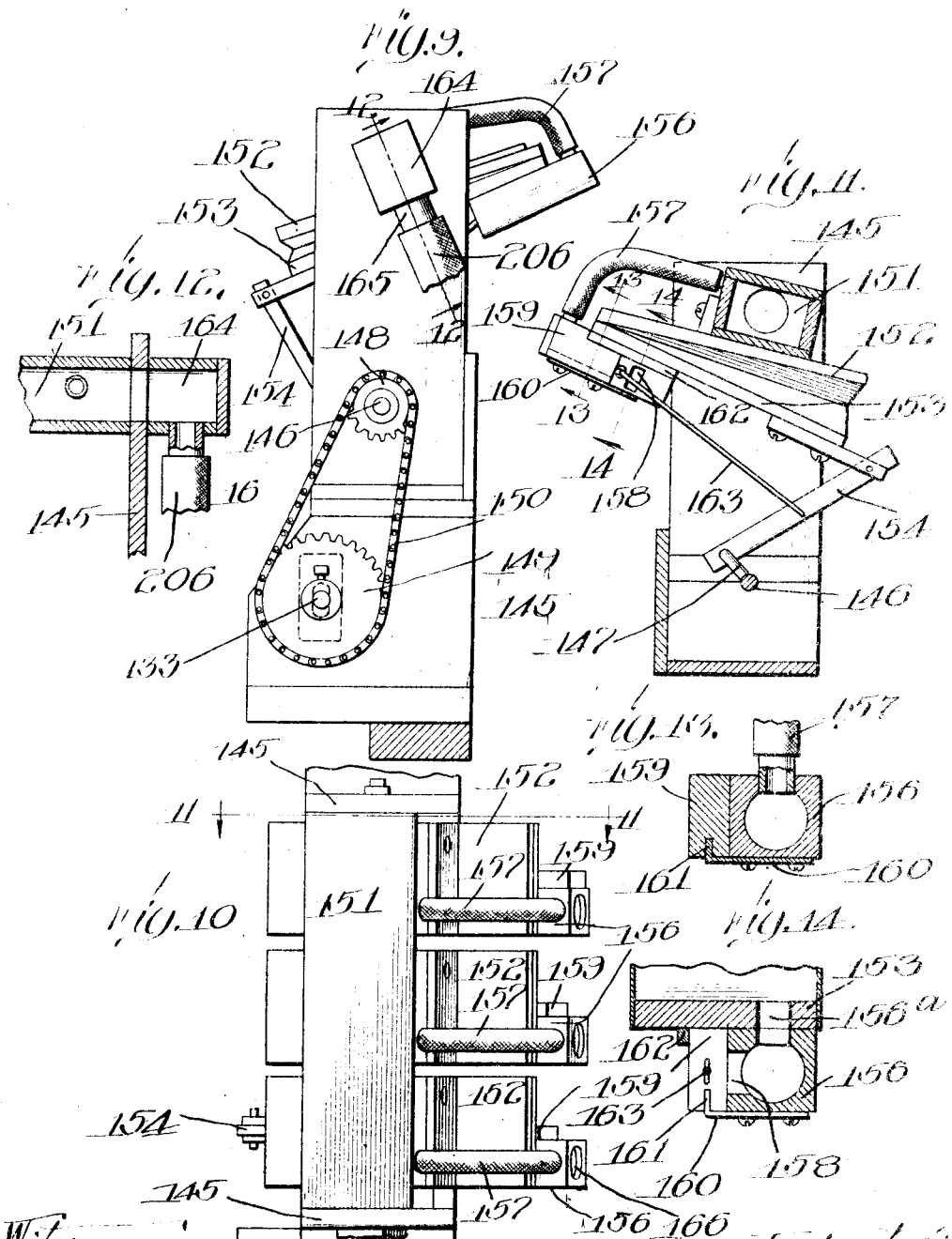

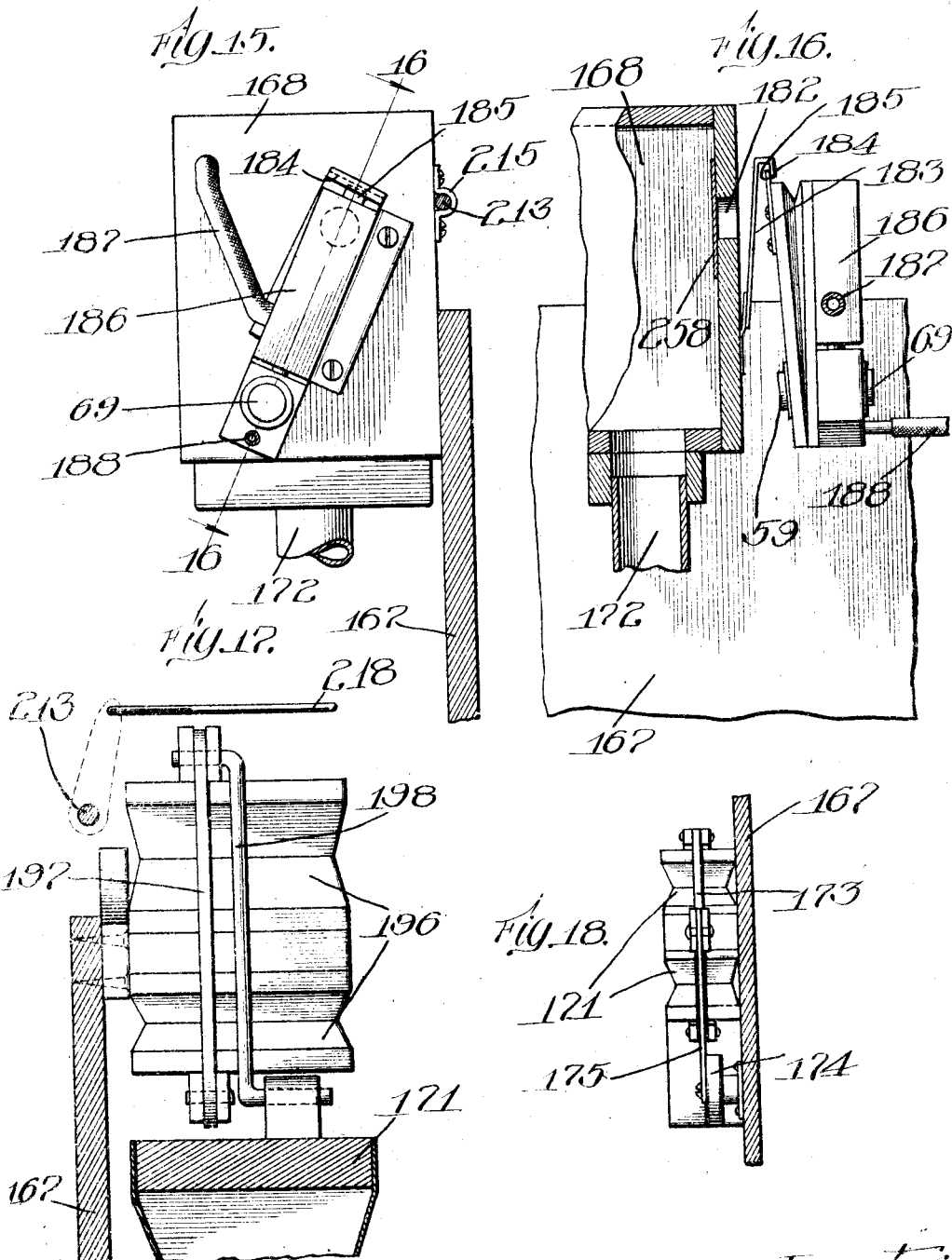

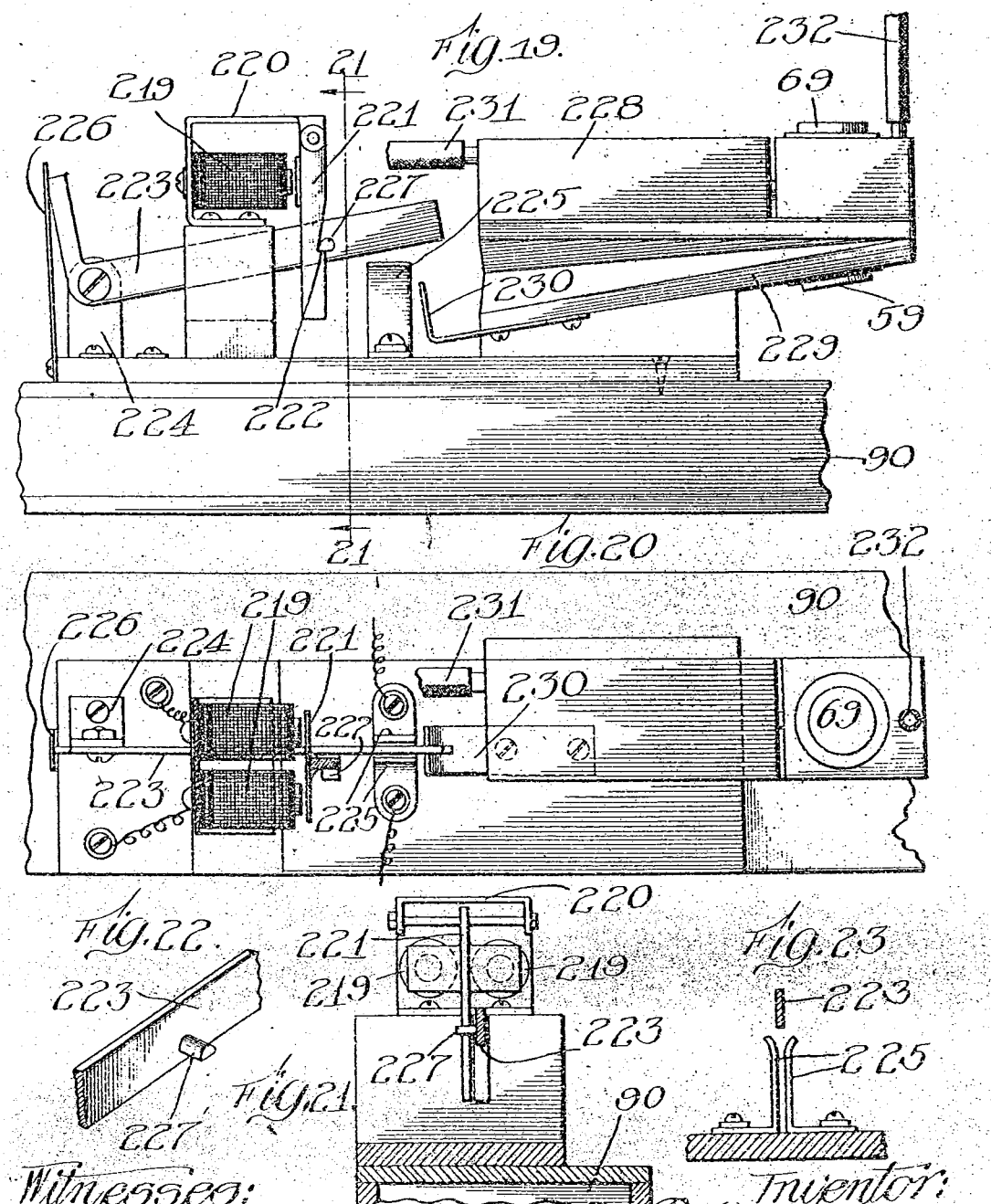

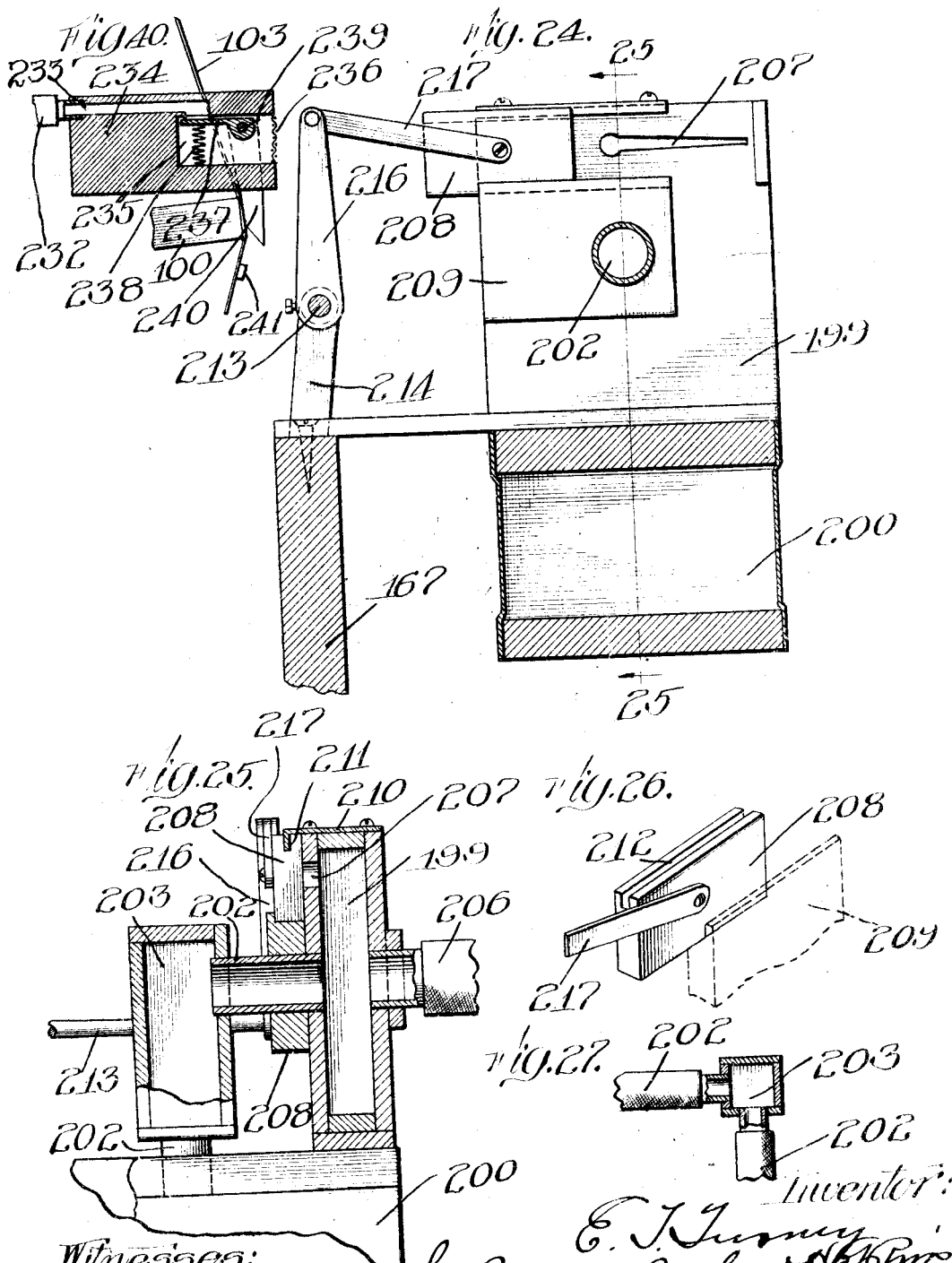
E. T. TURNEY.
PLAYING ATTACHMENT FOR MUSICAL INSTRUMENTS.
APPLICATION FILED AUG. 23, 1906.
1,107,557.
Patented Aug. 18, 1914.
9 SHEETS—SHEET 7.

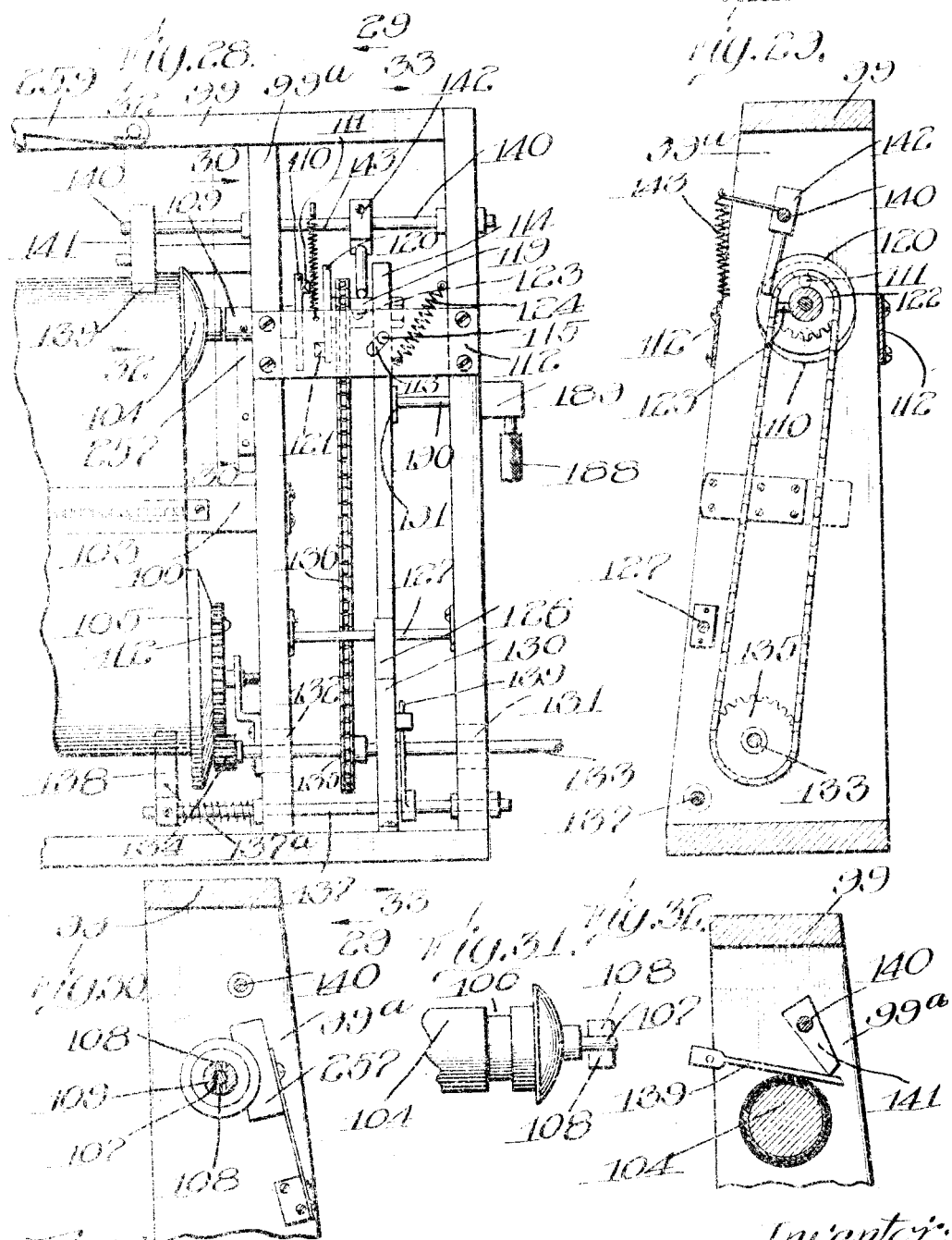

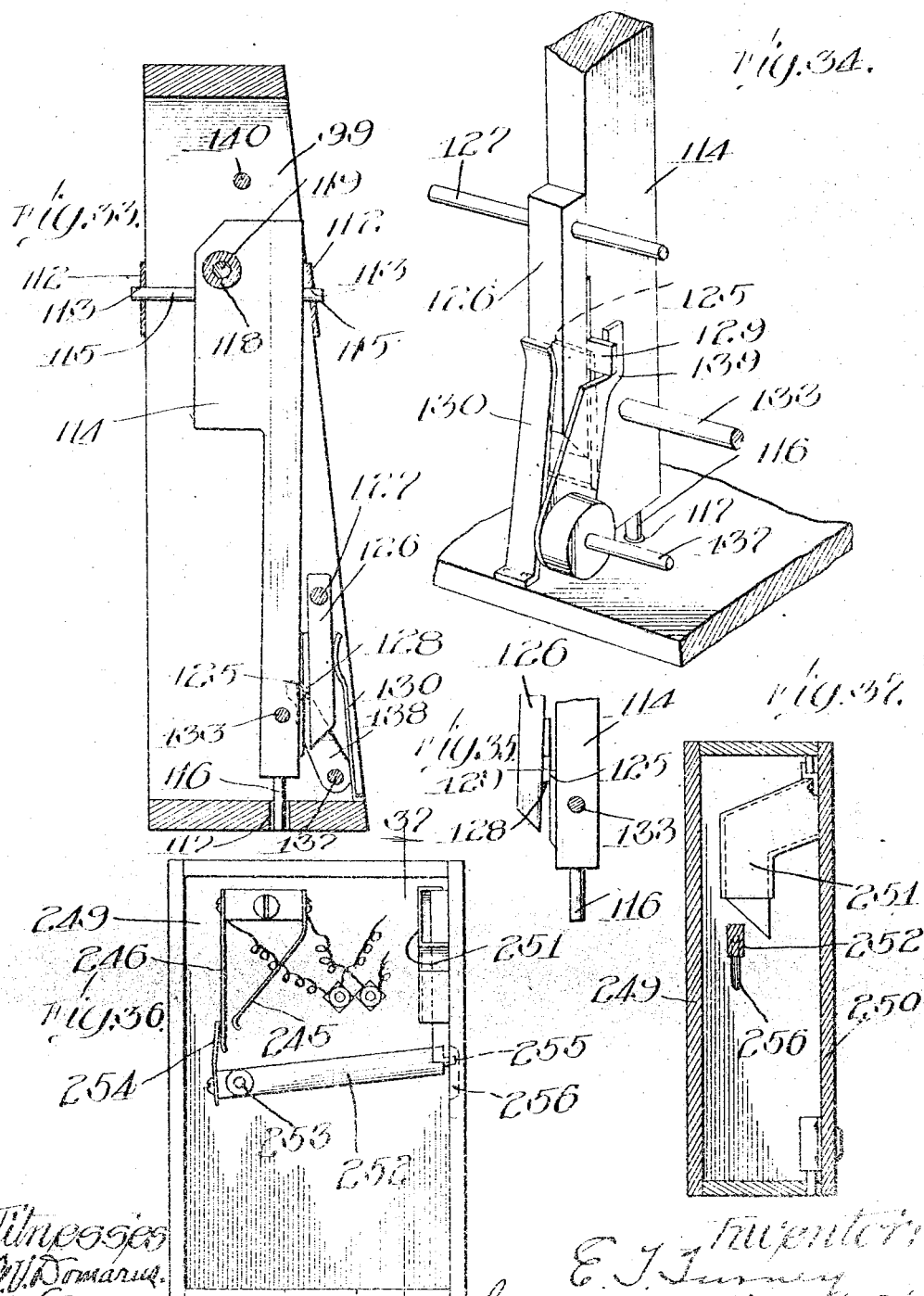

UNITED STATES PATENT OFFICE.

EUGENE T. TURNEY, OF CHICAGO, ILLINOIS, ASSIGNOR TO THE TURNEY COMPANY, OF CHICAGO, ILLINOIS, A CORPORATION OF ILLINOIS.

PLAYING ATTACHMENT FOR MUSICAL INSTRUMENTS.

1,107,557. Specification of Letters Patent. Patented Aug. 18, 1914.

Application filed August 23, 1906. Serial No. 331,740.

*To all whom it may concern:*

Be it known that I, EUGENE T. TURNEY, a citizen of the United States, residing at Chicago, in the county of Cook and State of Illinois, have invented certain new and useful Improvements in Playing Attachments for Musical Instruments, of which the following is a full, clear, and exact specification.

This invention relates to improvements in mechanical playing attachments for musical instruments, and more particularly piano playing attachments of the pneumatic type, and the primary object of the invention is to provide an improved device of this character which may be readily attached and placed within the casing of an ordinary piano.

A further object is to provide an improved device of this character containing a plurality of individual, or a unitary series of pneumatic actions which are connected to the tracker board, and any one or more of which may be readily removed or replaced without interfering with the remaining ones.

A further object is to provide an improved form of pneumatic action and an improved manner of attaching and supporting the same in position.

A further object is to provide improved means for preventing the accumulation of dirt or foreign matter from interfering with or obstructing the passage of air through the pneumatics.

A further object is to provide an improved means for feeding and rewinding the record without reversing the record operating motor.

A further object is to provide improved means and mechanism for starting and stopping the attachment.

A further object is to provide an improved device of this character which will be simple and cheap in construction, readily attached, and efficient in operation.

To the attainment of these ends and the accomplishment of other new and useful objects as will appear, the invention consists in the features of novelty in the construction, combination and arrangement of the various parts hereinafter more fully described and claimed and shown in the accompanying drawings illustrating an exemplification of the invention, and in which:

Figure 1 is a front elevation of a piano with an attachment constructed in accordance with the principles of this invention applied thereto, and with the front of the casing removed; Fig. 2 is a sectional view on line 2—2 of Fig. 1; Fig. 3 is an enlarged sectional view of one of the pneumatic actions showing the manner of supporting and connecting the same to the air duct or channel, and its connection with the piano action; Fig. 4 is a sectional view on line 4—4 of Fig. 3; Fig. 5 is a rear elevation of one of the air ducts, with a plurality of pneumatics in position; Fig. 6 is a sectional view of the communicating ends of the air ducts or channels and the connecting chamber; Fig. 7 is an enlarged detail perspective view of the supporting and securing means for the pneumatics; Fig. 8 is a sectional view on line 8—8 of Fig. 3; Fig. 9 is a side elevation of the record operating motor, and its supporting frame; Fig. 10 is a plan view of Fig. 9; Fig. 11 is a sectional view on line 11—11 of Fig. 10; Fig. 12 is a sectional view on line 12—12 of Fig. 9; Figs. 13 and 14 are sectional views respectively on lines 13—13 and 14—14 of Fig. 11; Fig. 15 is a view on line 15—15 of Fig. 1, looking in the direction of the arrows; Fig. 16 is a sectional view on line 16—16 of Fig. 15; Fig. 17 is a view on line 17—17 of Fig. 1, looking in the direction of the arrows; Fig. 18 is an end elevation of the main bellows or pneumatic, and its operating means; Fig. 19 is an elevation of the starting and stopping mechanism; Fig. 20 is a plan view of Fig. 19; Fig. 21 is an elevation partly in section on line 21—21 of Fig. 19; Fig. 22 is a detail perspective view of a portion of the circuit closing arm or lever; Fig. 23 is an end elevation of the circuit contacts with the closing arm or lever in section; Fig. 24 is an elevation partly in section of the regulating mechanism for the record operating motor; Fig. 25 is a sectional view on line 25—25 of Fig. 24; Fig. 26 is a detail perspective view of the regulating valve; Fig. 27 is a sectional view of a form of connection adapted to be used to connect two operating pneumatics or bellows; Fig. 28 is an elevation of the record operating and winding mechanism; Fig. 29 is a sectional view on line 29—29 of Fig. 28; Fig. 30 is a sectional view on line 30—30 of Fig. 28; Fig. 31 is a detail view of one end of the record spool or drum; Fig. 32 is a sectional view on line 32—32 of Fig. 28; Fig. 33 is a sectional view on line 33—33 of Fig. 28; Fig. 34 is a detail perspective view of the lock and releasing device for the record rewinding mechanism; Fig. 35 is an enlarged detail view of the lock; Fig. 36 is an elevation of the check controlled mechanism for completing the circuit to operate the motor; Fig. 37 is a sectional view on line 37—37 of Fig. 36; Fig. 38 is a diagrammatic view of the circuit; Fig. 39 is an elevation of the tripping mechanism for breaking the circuit to stop the motor; Fig. 40 is a sectional view on line 40—40 of Fig. 1.

In the drawings, the same reference numerals designate similar parts throughout the several views.

In this exemplification, the invention is shown as applied to an ordinary upright piano, the numeral 50 designating generally the casing, 51 the key-board, and 52 the piano action. An individual pneumatic action is provided for each key or action, and as they are all of the same construction the detailed description of one will apply to them all. These pneumatic actions preferably comprise a top 53 and a bottom 54 (see Fig. 3), which are connected by a flexible member 55 surrounding the edges and connecting the same to form a bellows. In the bottom, 54, adjacent the small end of the bellows is an aperture or opening 56 which is closed by a suitable valve 57, preferably in the form of a flap valve which is located on the outside or lower face o fthe bottom 54, and is preferably provided with a projection 57ª adapted to extend into the opening 56.

A cap or cover 58 is provided as a protection for the valve 57, and has an opening 59 which is preferably closed by a piece of reticulated material 60, such as wire gauze or the like, to prevent dirt or foreign matter from passing the valve 57 and entering into the pneumatic. The top 53 is also provided with an aperture 61 adjacent and registering with the aperture 56 and is of diameter somewhat larger than the diameter of the aperture 56.

Secured to and supported by the top 53 is a valve casing designated generally by the numeral 62, and this casing is provided with a compartment or chamber 63 which communicates with the aperture or opening 61. Secured between the casing 62 and the top 53 is a support or guide 64 which is provided with a raised portion 65 on its upper face to form a valve seat (see Fig. 4). Above the chamber or compartment 63 is another compartment or diaphragm chamber 66 between which chamber and the chamber 63 is an aperture or opening 67, which is located in such a position as to register with an opening in the guide or support 64. The top of this compartment or chamber 66 is closed by a diaphragm 68 of any suitable material which in turn is covered by a suitable cap or cover 69. A valve 70 is located and moves within the compartment or chamber 63 and is adapted to engage and rest upon the valve seat 65 to close the communicating opening between the compartment or chamber 63 and the interior of the pneumatic. This valve is provided with a stem 71 which projects above the top and bottom thereof. The portion of the stem projecting from the bottom of the valve extends through the opening in the support or guide 64 and into the opening 56 in the bottom 54 of the pneumatic, and is of such a length that when the top and bottom 53—54 are separated from each other its extremity will engage the projection 57ª to slightly open the valve 57, but when the pneumatic is collapsed, in a manner to be set forth, the end of the stem will engage the projection 57ª and seat the valve 57. The upper portion of the stem which projects above the valve extends through the opening 67 and into the diaphragm chamber or compartment 66, and is provided with a head 72 which normally stands adjacent the diaphragm 68.

Adjacent the compartment or chamber 63 and the diaphragm chamber or compartment 66 is a third compartment or chamber 73, which is provided with an opening in the top thereof into which is preferably inserted one end of a tubular member 74 the free extremity of which projects above the top of the chamber, for a purpose to be hereinafter set forth. The diaphragm chamber or compartment 66 communicates with the compartment or chamber 73 by means of a port or passage 75 and the port or passage 76 forms a communication between the compartments or chambers 63—73. Secured across the port or passage 76 is a disk or member 77 of any suitable material, which is provided with an aperture 78 of a diameter considerably smaller than the diameter of the port or passage 75, so as to form a very restricted opening or passage between the compartments or chambers 63—73. A suitable gauze or reticulated material 79 may be secured over and is spaced from the disk or member 77, and preferably within the compartment or chamber 73, to prevent foreign matter from entering the aperture or opening 78 and clogging the same. If desired, the compartment or chamber 73 may be provided with an opening closed by a suitable closure 80, whereby access may be had into the compartment or chamber. The compartment or chamber 63 is also provided with an opening 81 through the side thereof, preferably opposite to the opening 76, into which is inserted one end of a tubular member 82, the other end of which extends beyond the side thereof, and is preferably supported above and out of contact with the top 53 of the pneumatic.

Secured to the top 53 adjacent the end opposite to the valve chamber is a fastening device preferably in the form of a plate 83 having an upstruck portion 84 bent in the form of a lip or hook preferably directed toward the free end of the pneumatic and away from the valve chamber. Secured to the bottom 54 and projecting beyond the free or larger end of the pneumatic is an arm or projecting plate or lip 85 which is adapted to stand below and in close proximity to a lip or projection 86 on the piano action when the pneumatic is placed in position.

Secured to suitable supports or brackets 87 on the piano casing is an air duct or channel 88 and spaced from and supported above this duct or channel preferably by means of spacing and supporting blocks 89 is a second air duct or channel 90. These ducts or channels are preferably polygonal in shape and closed at their ends. They are located in close proximity to the keyboard and extend substantially across the entire keyboard. Located between these ducts or channels preferably adjacent one end is a chamber 91 with which the ducts or channels communicate, preferably by means of the apertures or openings 92 (see Fig. 6) and projecting into and communicating with this chamber 91 is one end of a tubular member 93. The lower face of each of the ducts or channels 88—90 is provided with countersunk portions 94 which open through the rear edge (see Figs. 3 and 5) and secured across the open side is a strip or member 95 which is spaced from the bottom of the countersunk portion to form slots or openings 96.

The front walls of the ducts or channels are provided with apertures 97. The pneumatic actions are secured in position by first passing the bent end of the plate 83 which is secured to the top member 53, into the countersunk portion 94, and shoving the bent portion 84 into the slot or opening 96 between the bottom of the duct or channel and the strip or member 95, and at the same time inserting the free extremity of the tubular member 82 into the aperture 97 in the front of the duct or channel. With this arrangement it will be seen that the pneumatic actions may be quickly placed into position into the case and removed therefrom and that the tubular member 82 which serves as a support for one end thereof also forms a communicating passage between the air ducts or channels, and the chamber or compartment 63. The bent portion of the clip 84 also serves as a means to prevent the extremity of the tubular member 82 from being pressed too far into the air duct or channel. When the air is exhausted from the pneumatic, in a manner to be described, the member 54 will rise, causing the extension 85 to engage the lip or projection 86 on the piano action 52 to cause the hammer to strike the string. With this improved construction and arrangement, it will also be apparent that the actions are not only independently removable, but are so arranged and supported that access may be freely had to any of them from the front of the piano case.

Supported by suitable brackets or supports 98 is the record holding frame 99 which also supports the tracker-board 100, the latter being provided with a series of air ducts or channels 101 passing therethrough. A plurality of flexible tubes or pipes 102 are secured to the tracker board, each of which communicates with one of the air ducts or channels 101 and the other end of each is removably secured to the free extremity of the tubular member 74 of one of the pneumatic actions so as to permit the latter to be readily removed.

The ordinary perforated record 103 is held upon the spool 104, passes over the tracker-board 100, and is wound upon the receiving spool or drum 105. The spool or drum 105 is rotatably supported by one end in a suitable bearing in one side of the frame 99, and by a suitable bearing supported by an upright or partition 99ª adjacent and spaced from the other side of the frame. The roller or spool 104 is provided with a circumferential groove or depression 106 (see Fig. 31) for a purpose to be set forth, and is journaled by one end in a suitable bearing in one side of the frame, the other end being provided with a trunnion 107 having laterally projecting lugs 108, adapted to enter and be held in a slotted or recessed rotatable sleeve or bearing 109 mounted in the partition 99ª, and secured to this rotatable sleeve or bearing 109, preferably on the outside of the partition 99ª is a disk 110 provided with a laterally projecting lug or pin 111, one face of which is preferably beveled for a purpose to be set forth.

Secured to or carried by the end of the spool or drum 105, preferably the end adjacent the same side of the frame in which the sleeve or bearing 109 is mounted, is journaled a gear 112ª.

The partition 99ª is spaced some distance from the adjacent end of the frame 99 and secured across the front and rear edges thereof are plates 112 which are adjacent and parallel to each other. Each of these plates is provided with a diagonally disposed slot 113, which slots are parallel with each other and preferably incline downwardly toward the partition or standard 99ª. A bodily movable member or support 114 is located between the plates 112ª, and projecting from the front and rear edge thereof is a pin or projection 115, which stand and are movable in the slots 113, so that when the member 114 is depressed the slots will cause the member to move toward the partition 99ª, and when raised will move away from the partition 99ª and toward the adjacent end of the frame 99. The lower extremity of the member is preferably reduced as at 116, and passes through an aperture or opening 117 and serves to guide the lower end and hold the same against displacement. This opening 117 is of sufficient size to permit the upper end of the member to rock toward the partition 99ª when being depressed. Journaled in the upper portion of this member, preferably adjacent the projections 115, and in a suitable bearing 118, is a stub shaft 119 which is held from displacement in any desired manner. This shaft is preferably located in line with the trunnion 107 of the record spool, and supported by one end and rotatable therewith is a disk 120 which is preferably located adjacent to and is of the same size as the disk 110. Projecting from the face of this disk is a lateral lug or extension 121 which is provided with a beveled or inclined face. These two disks 110 and 120 are adapted to be brought into close proximity to each other when the member 114 is depressed, so that the lugs or projections 111-121 will engage and interlock to form a clutch for locking the stub shaft 119 and the end of the record spool together.

Supported by and rotatable with the stub shaft 119 is a sprocket wheel 122, and a laterally projecting lug or extension 123 is arranged on the stub shaft 119, preferably at a point between the sprocket 122 and the member 114. The member 114 is normally held in its extreme upper position with the projections 115 at the tops of the slots 113 and with the disks 110-120 separated preferably by means of a spring 124, one end of which is secured to the member 114 and the other to the end of the frame 99. The lower extremity of the member is provided with a projecting portion 125 formed in any suitable manner.

A latch or dog 126 is pivotally supported adjacent the lower end of the member 114 by means of a rod or bar 127 passing transversely therethrough, and with its ends journaled in the partition 99ª, and the end of the frame 99. This latch or dog is provided with a shoulder 128 preferably formed by securing a plate to the face thereof and which is provided with an ear or extension 129 projecting beyond the side of the latch or dog. A spring 130 engages or rests against the latch or dog 126, and tends to force the shoulder 128 inward so that when the member 114 is depressed the projection 125 thereon will pass under and be held by the shoulder 128 to lock the member down and hold the disks 110-120 in contact.

Passing through suitable slots 131-132 respectively in the end of the frame 99 and the partition 99ª is one end of a flexible shaft 133, the other end of which is journaled in a suitable support 134 secured to the piano frame 50. On the extremity of the end which passes through the slots 131-132 is a pinion wheel 134 which meshes with the gear 112 to rotate the record receiving spool or drum 105. This shaft 135 passes through and has a bearing in the movable member 114. Is adapted to be flexed when the member 114 is depressed to disengage the pinion 134 from the gear 112. Secured to and rotatable with the shaft 133, and located preferably between the member 114, and the partition 99ª and in a direct line with the sprocket 122 is a sprocket 135, and passing around these sprockets is a chain or belt 136.

Journaled preferably at the base of the partition 99ª and the end of the frame is a rock shaft 137, one end of which projects beyond the partition and terminates adjacent to and is parallel with the record receiving spool or drum 105, and secured to this shaft is an arm 138 which is adapted to engage and rest upon the spool or drum 105. A suitable spring 137ª is provided to normally tend to hold the arm 138 against the spool or drum. Secured also to the shaft 137 is an arm 139 which is located adjacent to the projection 129 on the pawl or latch 126, and is adapted to engage the projection when the shaft 137 is rocked in a manner to be set forth, to trip the latch or dog 126 to release the member 114.

Pivotally supported by the partition 99ª adjacent the top thereof is an arm 139ª, the free end of which rests upon the record when wound upon the spool 104, at a point directly above the groove or recessed portion 106 in the spool 104 when the latter is in position. A rock-shaft 140 is journaled in the frame 99 and partition 99ª with one end adjacent the arm 139ª, and secured to this shaft is an arm 141, the free end of which engages and rests upon the arm 139.

Secured to the shaft 140 is an arm 142, the free extremity of which is adapted to be brought into a position in the path of movement of the lug or projection 123 on the stub shaft 119 when the latter is rotated, and the arm 139 drops into the groove or recess 106, in a manner to be described. When the spool 104 contains any portion of the record the extremity of the arm 142 will be held out of the path of movement of the lug or projection 123. A suitable spring 145, one end of which is secured to the shaft 140, and the other to a suitable point, preferably one of the plates 112, normally tends to rock the shaft 140 to cause the extremity of the arm 142 to normally tend to move into the path of the movement of the lug or projection 123. The upper portion or top of the frame 99 may be removably held in position in any suitable manner, preferably by means of bars or braces 144.

A suitable motor is provided to rotate the shaft 146, which preferably comprises a frame 145 suitably supported adjacent the shaft. Journaled in this frame is a shaft 146 provided with a plurality of cranked portions 147, and secured to this shaft is a sprocket wheel 148 arranged in line with a sprocket wheel 149 on the shaft 133, and passing around these sprockets is a chain or belt 150. Any suitable means may be provided for tightening this chain or belt 150. Supported by the frame, preferably above the shaft 146, is an air or suction chest 151, and secured to and supported by the bottom of the chest is a plurality of bellows or pneumatics 152. Pivotally attached to the movable member 153, adjacent the large end of each bellows, is one end of a link or rod 154, the other end of which is connected to one of the cranks 147 of the shaft 146. These links are substantially of the same length and the cranks are so arranged that when the bellows or pneumatics are inflated or exhausted they will transmit a steady and continuous rotation to the shaft 133, through the medium of the sprocket wheels 148—149 and chain 150.

Attached to the movable member of each bellows or pneumatic, preferably adjacent the smaller end, is a chamber 156 which has communication 156ª with the chest 151, preferably by means of a flexible member 157. The chamber 156 is provided with an exhaust aperture 158 which is adapted to be opened and closed by a valve or slide 159 which is supported by a plate 160 secured to the chamber 156, the free end of which is bent upwardly as at 161 to form a track which is preferably spaced from the chamber and enters a groove or slot in the valve or slide 159 for guiding and supporting the latter in position. The upper edge of this valve or slide is held from displacement by a suitable keeper 162. Pivotally connected to this slide or valve 159 is one end of a link 163 the other end of which is pivotally connected to the link 154. Thus it will be noticed that the operating link 154 for the shaft 146, the chamber 156, the slide or valve 159, and the operating link 163 for the slide or valve 159, are all secured to or supported by the movable member 153 of the bellows or pneumatic thereby permitting a compact arrangement and the positive operation of these parts within the smallest possible area of space. Secured to the outside of the frame 145 and communicating with the chest 151 is a chamber 164, which is provided with an aperture into which is inserted one end of a tubular member 165. The chamber 156 may also be provided with openings provided with suitable closures 166, in order that access may be had into the chamber when desired.

A removable board or plate 167 is placed within the base of the piano below the keyboard, and is held in position in any desired manner, and secured to and supported thereby preferably at a point adjacent the center of the piano is the main air chest 168. Leading from this chest is a tube or pipe 169 which communicates with a combiner chamber 170 which in turn has communication with the tubular member 93, having communication with the air ducts or channels 88—90.

A double pumper bellows 171 is supported by the board or plate 167 and also has communication with the chest or chamber 168 through the connection 172. A yoke 173 is connected by its ends to each side of the bellows pumper 171, and is in turn connected to a crank 174 by means of a link 175. A suitable motor 176 is geared or belted up to the crank 174, preferably by means of the belts 177—178, and the intermediate pulley 179.

When the motor is started it operates the pumper bellows 171 to suck the air from the chest or chamber 168, which in turn draws the air through the open duct or channel 101 in the tracker-board 100, flexible member 102, primary pneumatic, air duct or channel 88—90, chamber 170, and flexible member 169 to operate the respective hammer in a manner to be set forth.

In order to create a steady suction as the pumper bellows is changing from one side to the other, a suitable balancing pumper bellows or receiver 180 may be provided, which has communication with the chest or chamber 168, and is collapsed by the suction through the chamber or chest 168. At the time the pumper bellows 171 is changing a suitable spring 181 will expand the pumper bellows 180 to draw the air from the chest, and when changed the force of the bellows 171 is sufficient to overcome the tension of the spring 181 and will collapse the bellows 180. The chest or chamber 168 is provided with an aperture or opening 182 (see Fig. 16) located preferably on the end opposite to the end with which the tube or pipe 169 communicates, and this opening is covered with any suitable material, such as felt or the like, through which the air may pass into the chamber or chest to flush the chest with air to render the pneumatic actions inactive through re-winding. This aperture or opening is closed by a valve 183, preferably spring controlled, and is provided with a lip 184 adapted to be engaged by a projection 185 on a pneumatic 186, which is supported by the board or plate 167, and which is similar in construction to the pneumatic action 54. This pneumatic 186 has communication with the air chest or chamber 168 through the medium of the tube or pipe 187. Leading also from the pneumatic 186 is a tube or pipe 188, which communicates with a chamber 189 supported by the frame 99, and communicating with and projecting from this chamber 189 is a tubular member 190 (see Fig. 28), the end of which is adapted to be engaged and closed by a suitable closure 191 on the member 114, when the latter is in its extreme upward position and the disks 110—120 are separated, and when depressed the member 114 will move away from the end of the tubular extension 190 to open the same.

The end of the air chest or chamber 168 adjacent the tube or pipe 169 is provided with a slot 192 (see Fig. 2) which is adapted to be opened and closed by a suitable pivoted gate or valve 193 controlled by an operating bar or rod 194 extending to the front of the piano, and said gate or valve 193 is limited in its movement by means of a suitable guide 195. The object of this gate or valve is to regulate the tone or volume of the notes. If the opening 192 is entirely closed, a strong suction will be created through the tracker-board as the entire force of the bellows 171 is exerted upon the chest, but as the valve 193 is moved to increase the opening 192, air will be drawn into the chest through the opening and a weaker suction will take place through the tracker-board 100. Supported also by the board or plate 167 is a second double bellows 196, the movable sides of which are connected by a link 197, and a link 198 is pivotally connected to the top of one of the bellows, at one end, the other end being pivotally connected to the top of the double bellows 171, so that as said top rises and falls, the double bellows 196 will also be operated.

Communicating with a chamber 199 is an equalizing or balancing bellows 200, which is controlled by a spring 201. This bellows 200 has communication with the chamber 199 through the medium of the pipes 202 and chamber 203 (see Fig. 27), and this bellows also has communication with the double bellows 196 through the medium of the chamber 204, and the tubes or pipes 205; the chamber 204 being similar in construction to the chamber 203. The chamber 199 is connected to the chamber 164 by means of the pipe or tube 206, and provided with a tapering slot or opening 207, preferably arranged in the opposite side of the chamber. A suitable slide or valve 208 is supported and moves upon a guide 209, and is prevented from displacement by means of a plate 210, the edge of which is preferably bent at an angle 211, and enters a groove or slot 212, in the slide or valve 208.

A rock shaft 213 is journaled in a bearing 214, and a suitable bearing or hanger 215 on the chamber 168, and is provided with an arm 216, the end of which is connected by a link 217 to the slide or valve 208. This shaft is rocked by a suitable handle 218 to move the slide or valve 208 to open or close the opening 207, so as to regulate the speed of the record feeding motor in the same manner that the valve or slide 193 controls the volume or the sound of the notes.

Supported in any suitable manner, preferably by means of the air duct or channel 90, is a magnet 219, preferably in the form of coils and pivotally supported in front of the coils by means of an arm or support 220 is an armature 221, which is notched to form a shoulder 222 adjacent to its free end.

An arm or lever 223 is pivoted to a support 224, and the free end of this arm or lever is adapted to be forced and held between suitable contact points 225, by means of a spring 226. Projecting from the side of the arm or lever 223 is a pin or projection 227.

A pneumatic 228 similar in construction to the primary pneumatic action 54 is also supported by the air duct or channel 90 and projecting from the movable member 229 thereof is an arm or extension 230 which is adapted to engage the free end of the arm or lever 223 to raise the same out of engagement with the contact points 225, and in a position that the shoulder 222 will swing under and engage the projection or pin 227 when the bellows or pneumatic 228 is collapsed.

A tube or pipe 231 leads from the bellows or pneumatic 228 and communicates with the air duct or channel 90. A similar tube or pipe 232 leads from the pneumatic or bellows 228 and communicates with a port or passage 233 in a valve casing 234 supported by the frame 99. This casing is provided with a chamber 235 with which the port or passage 233 communicates, and said chamber opens through the casing and is covered with a suitable reticulated material 236.

A valve 237 is located within the chamber 235 and is controlled by a suitable spring 238. This valve is connected to a rock-shaft 239 which projects through the casing and secured to said shaft is an arm 240. The free end of this arm rests upon the record 103 when in place, and the spring 238 will keep the valve 237 closed to allow the port or opening 233 to be uncovered until a projection 241 on the record passes beneath the free end of the arm to raise the same and rock the shaft 239 to unseat the valve and open the port or passage 233, so as to permit the pneumatic or bellows 228 to be collapsed.

Ordinary batteries 242 may be employed to energize the magnet 219 through the conductors 243—244, so as to attract the armature 221 when the circuit is completed by means of the contact arms 245—246. When the arm or lever 223 falls between the contact points 225, the circuit will be completed through the conductors 247—248, and the field of the motor which will rotate the crank 174 and operate the mechanism.

Any suitable mechanism may be employed for causing the contact points 245—246 to be moved in engagement, but preferably a check operated mechanism. For this purpose the contacts 245—246 are inclosed within a casing 249 having a removable closure 250 through which opens a check slot or chute 251. An arm or lever 252 is pivoted as at 253 within this casing and is preferably provided with a projection 254 adapted to engage one of the contacts 245—246 and move it into engagement with the other contact when the lever or arm 252 is rocked about its pivot.

The free end of the arm or lever 252 stands adjacent the end of the chute 251 so that when a check is deposited into the chute it will engage and depress the adjacent end of the arm or lever 252, the extremity 255 of which may if desired move in a suitable guide or slot 256 to prevent lateral displacement of the arm.

In order to prevent the record 103 feeding too quickly from or on to the spool 104, a suitable brake 257 may be provided which preferably engages and exerts its pressure upon the stub shaft 109.

The operation of the pneumatic actions is as follows: When the air duct or channel 101 in the tracker-board 100 is closed by the record 103, the pneumatics will be expanded, but when a perforation in the record passes over the air duct or channel to open the same the suction caused by the bellows 171 through the chamber or chest 168, pipe or tube 169, and air ducts or channels 88—90, will draw air through the tube or pipe 102 into the chamber 73 from where it passes or bleeds into the chamber 63 through the opening 78 in the disk 77. The normal position of the diaphragm 68 is down and tends to hold the valve 70 upon the valve seat 65. The port or passage 75 being much larger than the opening 78, the air entering the chamber 73 will pass more rapidly into the chamber 66 to relieve the suction upon the diaphragm to render the latter inactive, and the air being exhausted from the chamber 63 more rapidly than the supply of the air through the bleed hole 78, the valve 70 will be raised from its seat by means of the closure or flat valve 57 actuated by the atmospheric pressure beneath the latter, the non-resistant exhaust in 63 permitting such action. This will move the end of the stem 71 out of engagement with the projection 57ᵃ on the valve 57 which will allow this valve to close when the air will be exhausted from the bellows through the opening 63, tending to raise the valve 70 higher, and the pneumatic will be collapsed, causing the projection 85 to rock the piano action by means of the projection 86. By the time the air has been exhausted from the pneumatic 70 the air will also be exhausted from the chamber 73 through the opening 78, the air duct or passage 101 in the tracker-board having been closed by this time by an imperforate portion of the record passing thereover. With the passage thus closed, a further suction through the chamber 63 will act directly upon the diaphragm 68 tending to draw the same downward. This movement will cause the extremity of the stem 71 to engage the projection 57ᵃ on the valve 57 to unseat the latter. The opening of this valve will break the vacuum in the pneumatic and air will rush into the pneumatic to fill and expand the same, allowing the member 54 of the pneumatic to drop, and the piano action 52 to rock back or assume its normal position. At the same time, the valve 70 will drop upon its seat 65. With this improved form of pneumatic action, and with the atmosphere above and below the diaphragm, the latter is simply lifted by the head 72 of the stem and in rising the confined air in the chamber 66 is expelled, thereby affording no resistance to the stem 71 except by its very slight weight.

It will be noted that the reticulated material 79 protects the opening 78 in the disk 77, and that any foreign matter drawn in through the tracker-board will accumulate in the chamber 73, which may be readily removed through the opening closed by the closure 80. The accumulation of the particles of dirt in the chamber 73 will not interfere with the passage of the air, unless the chamber is entirely full. This overcomes a very serious difficulty and is an essential feature in the successful operation of the pneumatics.

With pneumatics constructed, attached and secured in position in the manner according to the principles of this invention, it will be noted that any one or more of them may be removed without interfering with the remaining ones, by simply detaching the tube or pipe 102, and disengaging the projecting end of the tubular member 82, and the clip or fastener 84, from the supporting air duct or channel 88—90, and may be as readily replaced and attached. The action of the pneumatic 228 is the same as the pneumatic actions, but instead of being directly controlled by the record 103, is indirectly controlled thereby, by means of the stop or lug 241 thereon, which is preferably arranged at the end of a piece, and which engages and rocks the arm 240 to remove the valve 237 to open the port or passage 233 leading to the pneumatic. When this pneumatic 228 is collapsed it raises the arm or lever 230 to break the motor circuit in the manner already set forth. The action of the pneumatic 186 is also similar to the action of the pneumatic actions, but when the pipe 188 leading thereto is opened, the collapsing of the penumatic operates to unseat the valve 183 from the opening 182 in the air chest or chamber 168 to permit air to enter the chest or chamber, thereby relieving the suction upon the air-ducts or channels to prevent the operation of the keys or sounding the notes when the records are being rewound. When the aperture 182 is open there is still enough pressure to operate pneumatic 186, but not the striking bellows. In order to prevent the entrance of dirt or other foreign matter into the chest or chamber through the opening 182, this opening may be covered or closed by any suitable material 258, such as felt or the like, secured preferably over the opening on the side opposite to the valve 183. This material also serves to strain or slightly retard the air to prevent its rushing into the chest or chamber with great force or velocity which would produce a roaring sound.

Having thus described the specific operation of this exemplification of one of the primary pneumatics, and the pneumatics 228 and 186, the general operation of this improved mechanism is as follows:

Assuming the record to be on the spool or drum 104, and in position with one end extending across the tracker-board and secured to the spool or drum 105 in the ordinary manner with devices of this character, and with the pinion wheel 134 on the end of the flexible shaft 133, in mesh with the gear 112 on the spool or drum 105,—the primary pneumatics and the pneumatics 228—186 being full of air or expanded, and the arm or lever 223 raised out of engagement with the contacts 225, and in such a position that the lug or projection 227 will engage and rest upon the shoulder 222 on the armature 221, as shown more clearly in Fig. 19. When the parts are in this position, the projection 191 on the member 114 will rest against the end of and close the tubular member 190 leading to the pneumatic 186, and the arms 139—240 will engage and rest upon the record while the extremity of the arm 141 will engage and be supported by the arm 139. In this position, a check delivered into the casing 249 from the chute 251 will engage and depress the free end of the arm or lever 252 causing the arm or projection 254 to move the contact 246 into engagement with the contact 245, thereby completing the circuit through the coils 219. The coils thus energized will attract the armature 221, causing the shoulder to move from under the projection on the arm or lever 223. Thus released, the spring 226 will force the arm or lever 223 between the contacts 225, thereby completing the circuit through and starting the motor 176. This will rotate the crank 174 and through the medium of the rod or link 175 will operate the double bellows 171, causing a suction on the chest or air chamber 168, and on the air ducts or channels 88—90 through the pipe 169, chamber 170, and tubular member 93. Each of the pneumatic actions being connected to and having communication with the air ducts or channels 88—90 in the manner already set forth, a suction will be exerted upon each of the pneumatic to collapse them when a perforation in the record 103 passes over the respective air duct or channel 101. The operation of the bellows 171 will operate the bellows 196, which will respectively exhaust the air in the bellows or pneumatic 153. The expanding and collapsing of the respective bellows 153 will rotate the shaft 133, which in turn will feed the record by means of the pinion 134 and gear 112. This operation will continue until the record has reached the end of the piece. The balancing bellows or receivers 180—200 being for the purpose of equalizing the suction while the double bellows 171—196 are changing from one side to the other.

While any portion of the record 103 is on the spool 104, the arm 139 will rest thereon, and the arm 141 which engages the arm 139 will hold the rock shaft 140 in such a position that the extremity of the arm or projection 142 will be out of the path of movement of the lug or projection 123. The arm or projection 138 rests against the spool or drum 105, so as to hold the arm or bracket 139 out of engagement with the projection 129 on the latch or dog 126. As the record is fed off of the roller or spool 104, the arm 139 will move toward the periphery of the spool or roller by means of the strain exerted thereon by the spring 143, and will continue to so move until the end of the piece has been reached. At this time the end of the arm or projection 142 will have moved into the path of movement of the lug or projection 123.

The disk 110 will rotate with the spool or roller 104, while the disk 120 is rotated in the opposite direction by means of the sprockets 122—135, and the chain 136. When the record has been entirely fed off of the spool or roller 104, the end of the arm 139ª will drop into the circumferential groove or depression 106, which will permit the arm 141 under the influence of the spring 143 to assume a position to permit the end of the arm or projection 142 to assume a position in the path of movement of the lug 123. When the lug 123 strikes said end, a further rotation of the disk 120 through the medium of the sprocket 136, will cause the projection or lug 123 to slide past the end of the arm or projection 142, and such a movement will depress the member 114 against the tension of the spring 124; and as the member is depressed the inclined slots 113 and projection 115 will cause the member 114 to move toward the partition 99 to bring the disks 110—120 in contact so that when rotated the projecting lugs 111—121 will engage to lock the disks. When the member 114 is depressed the end of the flexible shaft 133 which passes therethrough will also be depressed to disengage the pinion 134 and the gear 112. In this position the shoulder 128 on the dog or latch 126 will engage the shoulder 125 on the member 114, and the latter will be locked in its depressed position. A further rotation of the shaft 133 in the same direction will then rotate the roller 104 to rewind the record on the roller 104, the arm 139 being first raised by the operator to move the end of the arm or projection 142 out of the path of movement of the lug or projection 123. If desired a suitable latch 259 may be provided for maintaining the arm 139 in its raised position.

As the record passes off of the roller or drum 105, and the diameter decreases, the spring 137ª tends to cause the arm 138 to move toward the spool and just as the arm engages the spool the arm or bracket 139 will engage the projections 129 to trip the dog or latch 126 against the tension of the spring 130 to permit the spring 124 to return the member 114 to its normal position to disengage the disks 110—120, and the pinion 134 to engage the gear 112. The arm 139 may then be released after a new record has been placed in position. The depression of the member 114 opens or uncovers the end of the tubular member 190 which permits the pneumatic 186 to be collapsed in a manner already set forth, to unseat the valve 183 to permit air to enter the chest or chamber 168 to prevent the operation of the pneumatic actions during the rewinding of the record.

The motor may be stopped by means of the projection 241 engaging and rocking the arm 240 to open the valve 237, which will permit the bellows or pneumatics 228 to be collapsed in the manner already described, to move the end of the arm or lever 230 out of engagement with the contacts 225 to break the circuit. A single record may contain a plurality of pieces and in this event, and when desired to stop the motor at the end of each piece, a suitable projection 241 is secured to the record at the end of each piece. With this improvement it will be noticed that the operating mechanism is secured to a single board or plate in the bottom of the instrument, and may be entirely removed without detaching any of the parts.

In order that the invention might be fully understood, the details of an embodiment thereof have been thus specifically described, but

What I claim is—

1. In a device of the class described, the combination of a tracker board provided with a series of air ducts, a series of independent pneumatic actions, each including a valve device and constituting a complete detachable unit, connections leading from the air ducts in the tracker board to the respective pneumatics, means for independently supporting each of said actions, and a piano action having a disconnected operative relation to said pneumatic actions.

2. In a device of the class described, the combination of a tracker board provided with a series of air ducts, a series of independent pneumatic actions, each including a valve device and constituting a complete detachable unit, connections leading from the air ducts in the tracker board to the respective pneumatics, a support, means for independently removably securing each of said actions to the support, and a piano action having a disconnected operative relation to said pneumatic actions.

3. In a device of the class described, the combination of a tracker board provided with a series of air passages, means forming a duct or channel, a series of independent pneumatic actions supported by said means and having communication with the duct or channel, connections between the air passages in the tracker board and the respective actions, each action including a valve device and constituting a complete unit detachable from said supporting means, and a piano action having a disconnected operative relation with said units.

4. In a device of the class described, the combination of a tracker board provided with a series of air passages, a series of pneumatic actions, each including a valve device inseparable therefrom and constituting therewith an independent detachable unit detachably connected with said action, a connection between the air passages in the tracker board and the respective actions, and a connection between all of said actions.

5. In a device of the class described, the combination of a tracker-board having a series of air passages, an air duct or channel, a series of independent pneumatic actions, means for removably securing said actions to the duct or channel, connections between said duct or channel and the pneumatics, said connections also serving as supports for the pneumatics, and connections between the air passages in the tracker board and the respective actions.

6. In a device of the class described, the combination of a tracker-board having a series of air passages, an air duct or channel, a series of independent pneumatic actions, means for removably securing each of the actions to the duct or channel for supporting the same, said means forming a communication between the duct or channel and the pneumatic, whereby the pneumatics may be independently removed without interfering with or dismembering any of the other pneumatics, and connections between the air passages in the tracker-board and the respective actions.

7. In a device of the class described, the combination of a tracker-board having a series of air passages, an air duct or channel, a series of independent pneumatic actions, means for removably securing one end of each of the actions to the duct or channel for supporting said end, said means forming a communication between the duct or channel and the actions, inter-engaging means on the duct or channel and the actions for supporting the other end of the latter, and connections between the air passages in the tracker-board and the respective actions.

8. In a device of the class described, the combination of a tracker-board having a series of air passages, an air duct or channel, a series of independent pneumatic actions, means for removably securing one end of each of the actions to the duct or channel for supporting said end, said means forming a communication between the duct or channel and the pneumatic, said duct or channel being provided with a recess in one face and having a slot in a wall thereof, a clip on the pneumatic adapted to enter the recess and extend into the slot for supporting the other end of the actions, and connections between the air passages in the tracker-board and the respective actions.

9. In a device of the class described, the combination of a tracker-board provided with air passages, an air duct or channel provided with an aperture in one wall, and having a recess in the lower face adjacent the other wall, said recess being provided with a slot in one wall thereof, a series of pneumatic actions, a tubular member adjacent one end of said pneumatic communicating with and projecting from the pneumatic, a clip adjacent the other end of the pneumatic, said actions being adapted to be secured to and supported by the air duct or channel by inserting the free end of the projecting tubular member into an aperture in the wall thereof and the clip into the recess, so as to project into the slot in the wall thereof, and connections between the air passages in the tracker-board and the respective actions.

10. In a device of the class described, the combination of a tracker board provided with air passages, an air duct or channel provided with an aperture in one wall and having a recess in the lower face adjacent the other wall, each of said recesses being provided with a slot in one wall thereof, a series of pneumatic actions a tubular member adjacent one end of the action communicating with and projecting beyond the pneumatic, a clip adjacent the other end of the action, said action being adapted to be secured to and supported by the air duct or channel by inserting the free end of the projecting tubular member into the aperture in the wall thereof, and the clip into the recess, so as to project into the slot in the wall thereof, means for limiting the insertion of the tubular member into the air duct or channel, and connections between the air passages in the tracker board and the respective actions.

11. In a device of the class described, the combination of a tracker board having an air passage therethrough, a plurality of air ducts or channels, a combiner chamber forming a communication between the ducts or channels, a plurality of series of independent pneumatic actions, means for detachably and independently securing a series of actions to each of the ducts or channels whereby one or more of the actions may be readily detached without interfering with or dismembering any of the other actions, and connections between the air passages in the tracker board and the respective actions.

12. In a device of the class described, the combination of a tracker board having a series of air passages therethrough, an air duct or channel, a series of independent pneumatic actions removably and independently supported by and having communication with the duct or channel whereby one or more of the actions may be readily detached without interfering with or dismembering any of the other actions, a communication between the air passages in the tracker board and the respective actions, means for exhausting the air from the duct or channel and the action for collapsing the pneumatics, and means for controlling the said actions from the air passages in the tracker board independently, each of said actions having a disconnected operative relation with the piano action.

13. A pneumatic action comprising a collapsible fluid chamber, a casing for a plurality of chambers, one of said chambers communicating with the fluid chamber, a valve in said chamber for controlling said communication, one of the chambers constituting a diaphragm chamber, a diaphragm in said chamber, a chamber communicating with the valve and diaphragm chambers and provided with a fluid inlet, an opening in the first said chamber communicating with the external air, a closure for the opening, means operated by said valve for controlling said closure and means whereby the fluid may be exhausted from the diaphragm chamber to seat the valve and to open the closure.

14. A pneumatic action, comprising a collapsible fluid chamber, a casing having a plurality of chambers, one of said chambers communicating with the fluid chamber, a valve in said chamber, one being a diaphragm chamber, a diaphragm in said chamber, one chamber having communication with the valve and diaphragm chambers and provided with a fluid inlet, an opening in the first said chamber communicating with the external air, a valve for closing the opening, means whereby the fluid may be exhausted from the valve chamber, means on the valve adapted to be engaged by the diaphragm to seat the valve, and means also on the valve adapted to engage and open the valve in the collapsible chamber when the first said valve is seated.

15. A pneumatic action comprising a collapsible fluid chamber provided with an opening to the external air, a valve for said opening, a casing provided with a chamber, said chambers having a communicating passage, a valve in the last said chamber for closing the passage, a second chamber in the casing, a diaphragm in said second chamber, a third chamber in the casing and having a fluid inlet, said chamber and the valve chamber being provided with a restricted passage therebetween through which the fluid may pass, said third chamber and the diaphragm chamber being also provided with a communicating passage of a larger diameter than the diameter of the passage between the said third chamber and the valve chamber, means whereby the fluid may be exhausted from all of said chambers through the valve chamber, a projection extending from one face of the valve into the second chamber and adapted to be engaged by the diaphragm to seat the valve, and a projection also extending from the valve adapted to engage and unseat the first said valve.

16. A pneumatic action, comprising a collapsible fluid chamber, having an opening to the external air, a valve for said opening, a casing having a chamber provided with a communicating passage with the first said chamber, a valve in said chamber adapted to close the passage, a supplemental chamber, means on the valve extending into said supplemental chamber, valve operating means in said supplemental chamber, a fluid chamber also within the casing and having a source of fluid supply, said chamber having communication with the valve and supplemental chamber, the communication with the supplemental chamber being of a larger diameter than the communication with the valve chamber, and means whereby the fluid may be exhausted to unseat the valve, exhaust the fluid chamber, and reseat the valve to uncover the opening in the fluid chamber to admit external air.

17. A pneumatic action, containing a valve chamber, a diaphragm chamber, and a fluid chamber, said fluid chamber having direct and unobstructed communication with both of the first said chambers, the communication with the valve chamber being smaller than the communication with the diaphragm chamber, a screen for protecting the smaller passage, said fluid chamber being provided with a fluid inlet, and an opening through which access may be had into the chamber and a closure for said opening, said valve chamber being provided with an outlet opening through which the fluid may be exhausted from all of the chambers.

18. A pneumatic action containing a valve chamber, a diaphragm chamber, and a fluid chamber, said fluid chamber having direct and unobstructed communication with both of the first said chambers, means for reducing the communication to the valve chamber, a screen for protecting the said means and the reduced communication, said fluid chamber being provided with a fluid inlet, and an opening through which access may be had into the chamber, and a closure for said opening, said valve chamber being provided with an outlet opening through which the fluid may be exhausted from all of the chambers.

19. A device of the class described, including a musical instrument casing, a series of independent pneumatic actions each including a valve device and constituting units, and a common duct member connected with said actions and supporting the series of units within the casing, each of said actions being independently removable as a complete unit, and freely accessible from the front of the casing.

20. A device of the class described, including a musical instrument casing, a plurality of independent pneumatic actions within the casing each including a valve device and constituting units, and a single support for said actions, having a duct connected with the actions, said actions being freely accessible from the front of the casing and independently detachable from the support and its coöperating parts as complete units and without interfering with any of the other parts of the instrument.

21. A device of the class described including a casing, a series of independent pneumatic actions, each including a valve device and constituting units, and a common duct member connected with said actions for independently and detachably supporting the actions within the casing, said actions being freely accessible from the front of the casing and removable as complete units.

22. A device of the class described, including a casing, a common air duct or channel in the casing, and a series of independent pneumatic actions also within the casing each including a valve device and constituting units, said actions being independently and detachably supported by the said duct, and each having communication therewith, said actions being freely accessible from the front of the casing as complete units.

23. In a device of the class described, the combination of a casing, a tracker board provided with a series of air ducts within the casing, a series of independent pneumatic actions also within the casing, and each including a valve device, connections leading from the air ducts in the tracker board to the respective pneumatics, and a common duct member connected with said actions for independently supporting each of said actions, said actions having disconnected operative relation to the piano action and being freely accessible from the front of the casing, said actions being independently removable as complete units.

24. In a device of the class described, the combination of a casing, a tracker board within the casing and provided with a series of air ducts, a series of independent pneumatic actions also within the casing, each including a valve device, connections leading from the air ducts in the tracker board to the respective pneumatics, a common air duct connected with and forming a support for said actions, and means for independently and removably securing each of said actions to the support, said actions having a disconnected operative relation to the piano action and being freely accessible from the front of the casing and removable as complete units.

25. A pneumatic action including a collapsible fluid chamber, a valve chamber having communication with the fluid chamber, a valve in said chamber controlling said communication, a diaphragm chamber, a diaphragm in the chamber, means operatively related to the valve and extending into the diaphragm chamber, means whereby the valve chamber and the said diaphragm chamber may be exhausted to cause the diaphragm to seat the valve, and means whereby the suction in the diaphragm chamber may be overcome, the last said means operating to unseat the valve to permit the said fluid chamber to be collapsed.

26. A pneumatic action including a collapsible fluid chamber, a valve chamber having communication with the fluid chamber, a valve in said chamber controlling said communication, a diaphragm chamber, a diaphragm in the chamber, means operatively related to the valve and extending into the diaphragm chamber, means whereby the valve chamber and the said diaphragm chamber may be exhausted to cause the diaphragm to seat the valve, and means whereby the suction in the diaphragm chamber may be overcome, the last said means operating to unseat the valve to permit the said fluid chamber to be collapsed, and also operating to automatically admit air to the fluid chamber to permit the latter to expand.

27. The combination of a vacuum bar, a plurality of combined valve devices and pneumatics, and an air exhausting tube serving to support a combined valve device and pneumatic in connection with the vacuum bar independent of the others.

In testimony whereof I have signed my name to this specification, in the presence of two subscribing witnesses, on this 21st day of August A. D. 1906.

EUGENE T. TURNEY.

Witnesses:
FRANCIS A. HOPKINS,
CHAS. H. SEEM.